& Meador

United States Patent [19]

Dutschke

[11] Patent Number: 5,016,822
[45] Date of Patent: May 21, 1991

[54] PARTICULATE MATERIAL LOADERS

[76] Inventor: Reginald V. Dutschke, P.O. Box 88, Brinkworth, South Australia, Australia

[21] Appl. No.: 440,241

[22] Filed: Nov. 22, 1989

[51] Int. Cl.$^5$ .............................................. A01C 17/00
[52] U.S. Cl. .................................... 239/651; 198/642
[58] Field of Search ............... 198/638, 642, 640, 641; 414/502; 239/651

[56] References Cited

U.S. PATENT DOCUMENTS

| 2,081,182 | 5/1937 | Malke et al. | 198/638 |
| 3,592,393 | 7/1971 | Sinden | 198/642 |
| 3,592,394 | 7/1971 | Sinden | 198/642 |

FOREIGN PATENT DOCUMENTS

| 2559206 | 7/1977 | Fed. Rep. of Germany | 198/642 |
| 1006337 | 3/1983 | U.S.S.R. | 198/642 |

Primary Examiner—Andres Kashnikow
Assistant Examiner—Lesley D. Morris
Attorney, Agent, or Firm—Baker, Maxham, Jester & Meador

[57] ABSTRACT

This invention relates to a particulate material thrower comprising an endless belt running over a pair of rollers which provides a loading end and discharge end on the belt, and a thrower wheel running adjacent to the belt over the roller at the discharge end. The thrower wheel is characterized by a plurality of vanes extending between the side flanges of the thrower wheel wherein the vanes are shaped in a manner so as to collect material on the belt before throwing. One advantage of the invention is to significantly increase the amount of acceleration that can be given to particles or other particulate matter without such energy being imparted to the materials quickly or in single step so that the material such as grain is not damaged. Another advantage of the invention is that it reduces side spillage or leakage from the belt.

15 Claims, 7 Drawing Sheets

PARTICULATE MATERIAL LOADERS

This invention relates to improvements in particulate material loaders or distributors of the belt thrower type.

Belt throwers which use a belt stretched between two rollers with an intermediate roller depressing the belt are well known but these have considerable problems with accuracy of throwing, speed and distance to which the material ban be thrown and damage to the material being thrown.

In particular, if the material is wheat or grain, accelerating the material to throwing speed too quickly can cause damage to the grain which will considerably reduce its value and usefulness.

For instance, Australian Patent Specification No. 494403 in the name of Nickolai describes a belt thrower which uses an intermediate wheel between two other wheels and in which the intermediate wheel depresses a belt down between the two wheels to provide an inlet chute on one side of the intermediate wheel and an outlet chute on the other. In practice however, the thrower does accurately throw material and while it can be used to broadcast, it is not useful for placement of material. Also, the acceleration of the material in this single step is such that damage can occur.

Many other belt throwers having varying amounts of belt contact with the intermediate wheel are shown in the literature.

One particular problem to which this invention is directed, therefore, is to significantly increase the amount of acceleration that can be given to particles or other particulate matter without such energy being imparted to the materials quickly or in a single step so that the grain or other material is not damaged. This appears to happen with the prior art machines.

Another problem to which this invention is directed is side leakage on the belt. This refers to the spillage of material over the sides of the belt before it passes under the intermediate wheel or to one side after it passes the intermediate wheel.

In one form, therefore, the invention is said to reside in a particulate material thrower comprising an endless belt running over a pair of rollers thereby providing a loading end and a discharge end, a thrower wheel running on the belt adjacent the roller at the discharge end, the thrower being characterised by the thrower wheel including side flanges and a plurality of vanes extending between the side flanges, the vanes being shaped and configured so as to assist with throwing of the particulate material.

Preferably the vanes are cupped, and by using cupped vanes, the particulate material being thrown is formed into parcels which are more accurately thrown than if thrown by a straight vane without any grouping or clumping together of the particulate material.

In one preferred embodiment of the invention, the endless belt may include continuous ridges along each side and the thrower wheel may include guide wheels running on the ridges.

These continuous ridges will assist with transfer of rotational energy from the thrower wheel if this is the driven wheel to the belt or vice versa if one of the rollers is driven in this machine. The ridges will also assist with preventing loss of particulate material from the sides of the belt as discussed above.

In one preferred embodiment, there may be further included preacceleration means to accelerate material placed on the belt before the material reaches the thrower wheel.

In one embodiment, the pre-acceleration means may comprise a second vaned wheel running on the belt between a point upon which particulate material is placed onto the belt and the thrower wheel.

In one preferred embodiment, the second vaned wheel may be driven at a slower speed than the first wheel by means of a belt drive from the first wheel.

The second vaned wheel may also include guide wheels running on the continuous ridges on the belt.

The second vaned wheel may also include cupped vanes.

In an alternative embodiment, the pre-acceleration means may comprise an elongated portion of the continuous belt so that the particulate material travels along the belt for a time before it passes under the thrower wheel.

By this means, the grain is able to accelerate up to belt speed as it is moved along the belt so that it is travelling at substantially the same surface speed as the thrower wheel before it passes under the thrower wheel thereby preventing damage to the particulate material.

There may be further included on the elongate portion of the continuous belt a hinged or fixed flap above the belt which may act as a compression flap to ensure that material dropped onto the belt does not bounce off while it is being accelerated up to belt speed.

Alternatively, maintaining the particulate material on the belt may be provided by a further continuous belt running on the first continuous belt to maintain the particulate material therebetween and to enable the particulate material to be accelerated to belt speed. The further continuous belt may be driven by drive wheels running on the continuous ridges on the main belt or by direct contact with the main belt.

On at least the thrower wheel and possibly on the second wheel of the earlier embodiment discussed above, each vane may be exactly radial or may be angled back from a radius of the wheel by between 0 and 5 degrees. This angle applied to the vanes assists with forming the particulate material being thrown into packages or clumps for throwing.

In essence, therefore, this invention provides a belt thrower which uses a pre-acceleration stage and then a cupped vane thrower wheel to assist with the acceleration of grain so that energy is not imparted to the particulate material in one step and, hence, less damage can be caused to the particulate material.

This then generally describes the invention, to assist with understanding, reference will now be made to the accompanying drawings which show preferred embodiments of the invention.

Figure 1:
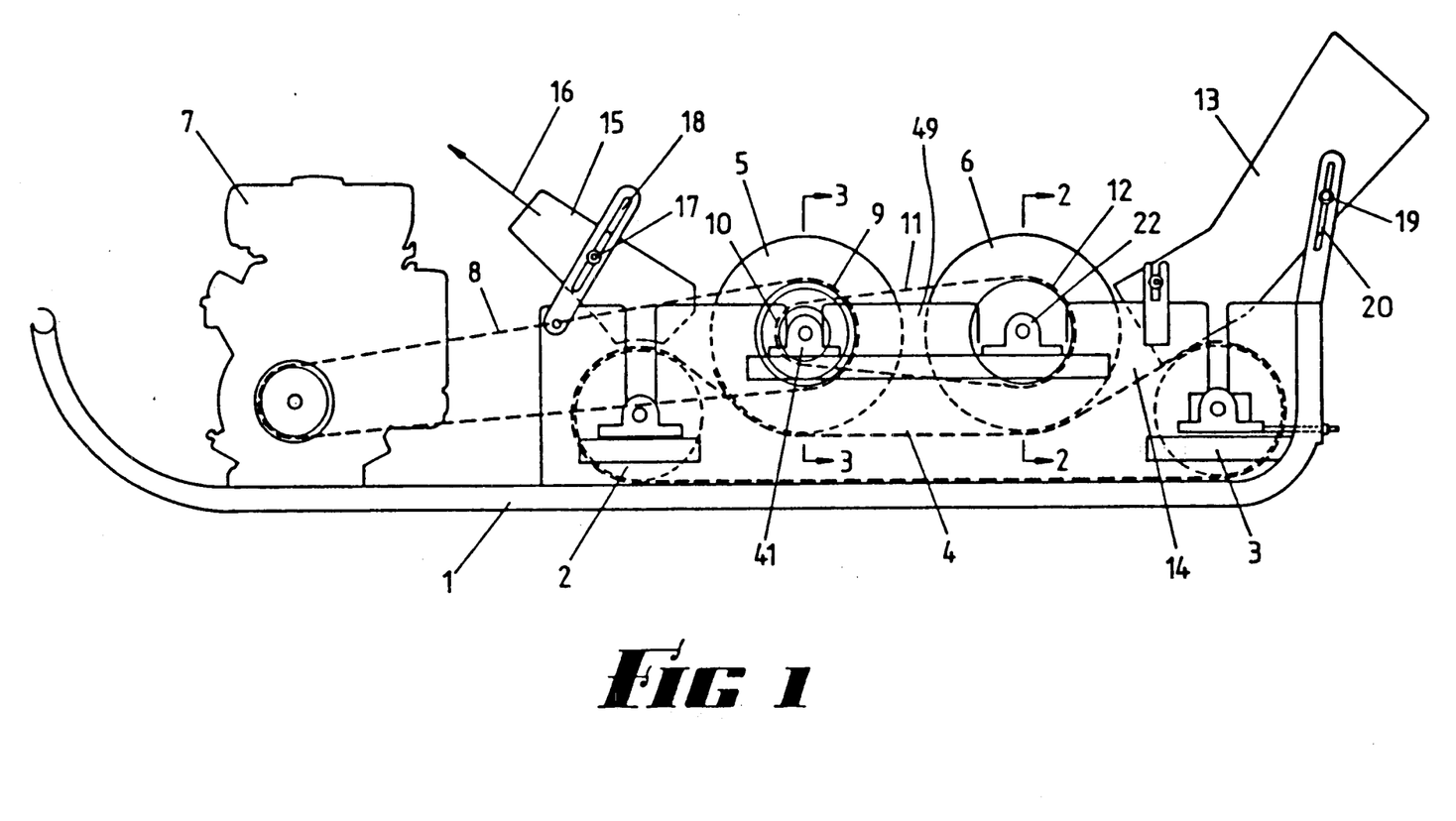
FIG. 1 shows, in side elevation, a first embodiment of the invention.
Figure 2:
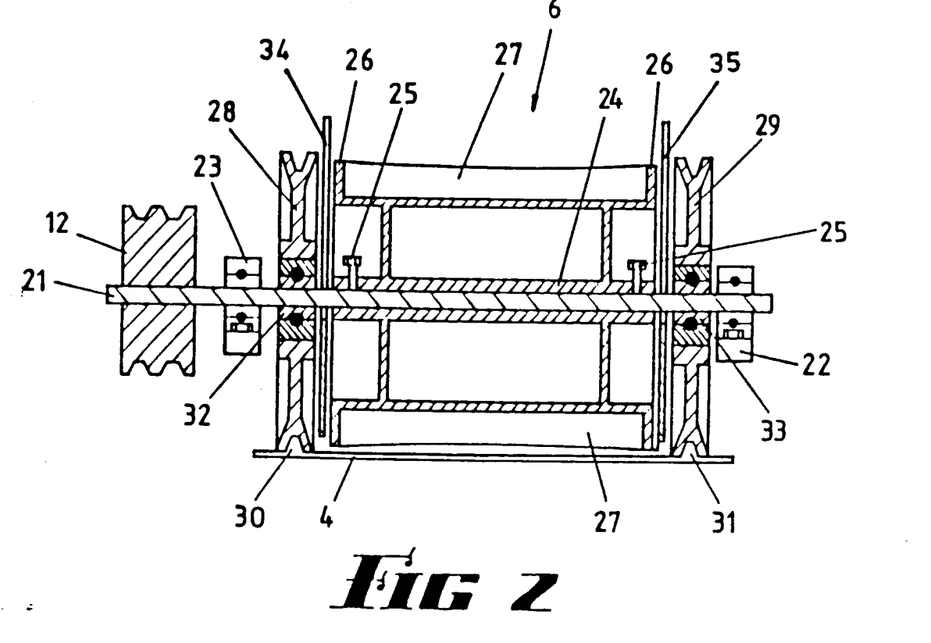
FIG. 2 shows a cross-sectional view of the pre-acceleration wheel of the embodiment shown in FIG. 1.
Figure 3:
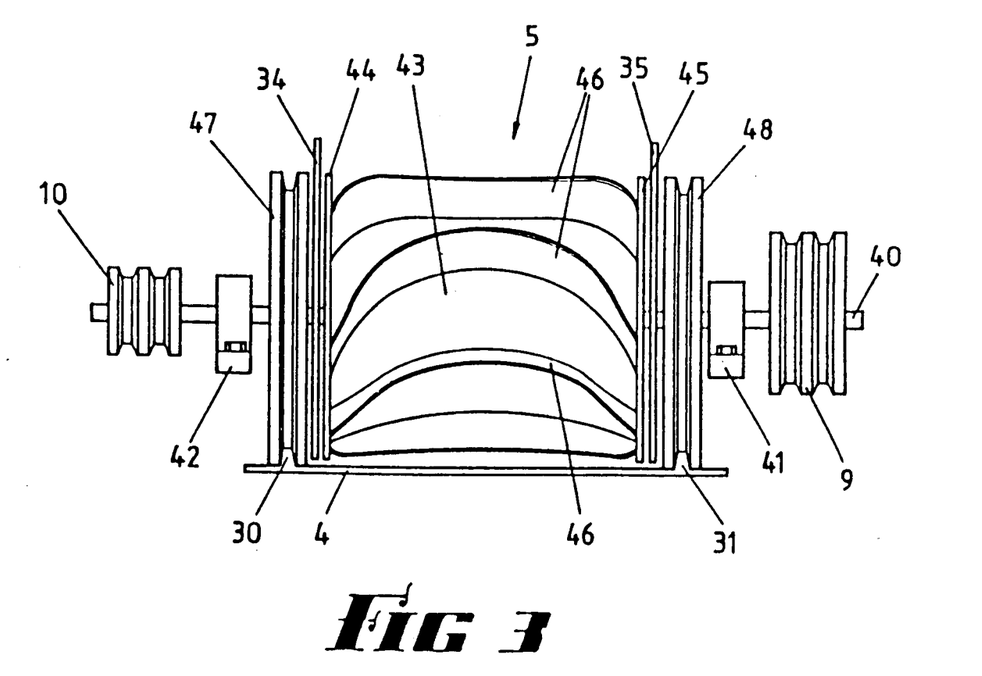
FIG. 3 shows a view of a thrower wheel of the embodiment shown in FIG. 1.

In the first embodiment as shown in FIGS. 1, 2 and 3, the thrower has a frame 1 which supports rollers 2 and 3 with roller 2 being the discharge end roller and roller 3 being the loading end roller. A continuous belt 4 passes over the rollers 2 and 3 and is depressed between the rollers 2 and 3 by thrower wheel 5 and pre-acceleration wheel 6.

Motor 7 drives drive belt 8 which drives by means of pulley 9 the thrower wheel 5. A further pulley 10 on the thrower wheel 5 drives by means of belt 11 a pulley 12 on thrower wheel 6.

The difference in diameter between pulleys 10 and 12 is such that the thrower wheel 6 is driven at approximately half the rotational speed of the thrower wheel 5.

Particulate material entry chute 13 allows grain or other particulate material such as fertilizer to enter into the region 14 before the pre-acceleration wheel 6 and outlet chute 15 takes material directed from thrower wheel 5 and directs it as shown by arrow 16. The position of the outlet chute can be varied by means of bolt 17 in slotted arm 18 and similarly the position of the inlet chute 13 can be altered by changing the bolt 19 on slotted arm 20.

We now look more closely at FIG. 2 which shows the preacceleration wheel 6 in cross-sectional detail. A shaft 21 is supported on bearings 22 and 23 mounted to the frame 1. Pulley 12 on the shaft 21 enables the shaft to be driven and drives the thrower wheel 6. The thrower wheel comprises a central boss 24 mounted by means of screws 25 to the shaft 21 so that the thrower wheel rotates with the shaft and includes side flanges 26 between which are mounted vanes 27.

The vanes may be straight or cupped. Guide wheels 28 and 29 run on ridges 30 and 31 respectively on the belt 4 but have bearings 32 and 33 so that the guide wheels are not rotated by the shaft 21 but are driven by the belt 4.

By this means, the thrower wheel 6 is just supported off the belt 4 so it can be driven at a different speed than the belt to assist with pre-acceleration of the grain or other particulate matter.

Between the guide wheel 28 and the side flange 26 on one side and guide wheel 29 and side flange 26 on the other side of the pre-acceleration wheel 6 are gaps into which fit the side plates 34 and 35.

The thrower wheel 5, as shown in FIG. 3, however, is driven at belt speed. This thrower wheel includes a shaft 40 which is driven by pulley 9 from the motor 7 as shown in FIG. 1 and in turn drives pulley 10 which drives pulley 12 on wheel 6. The shaft 40 is supported on bearings 41 and 42 mounted to the frame 1. The wheel 5 is mounted onto the shaft 40 in much the same manner as the wheel 6 is mounted on the shaft 21.

The wheel 5 includes a cylindrical portion 43, side flanges 44 and 45 and positioned therebetween cupped flanges 46. The cupped flanges are in a trailing position so that as the wheel rotates the side of the cupped flange meets the belt before the centre of the cupped flange.

Guide wheels 47 and 48 run on the ridges 30 and 31 respectively on the belt 4 to drive the belt. The guide wheels on this thrower wheel are fixed to the shaft 40.

There is a gap between the guide wheel 47 and the thrower wheel 5 and similarly between the guide wheel 48 and the thrower wheel 5 into which side plates 34 and 35 are positioned, as also shown in FIG. 1, to prevent loss of particulate material from the side of the belt.

Figure 4:
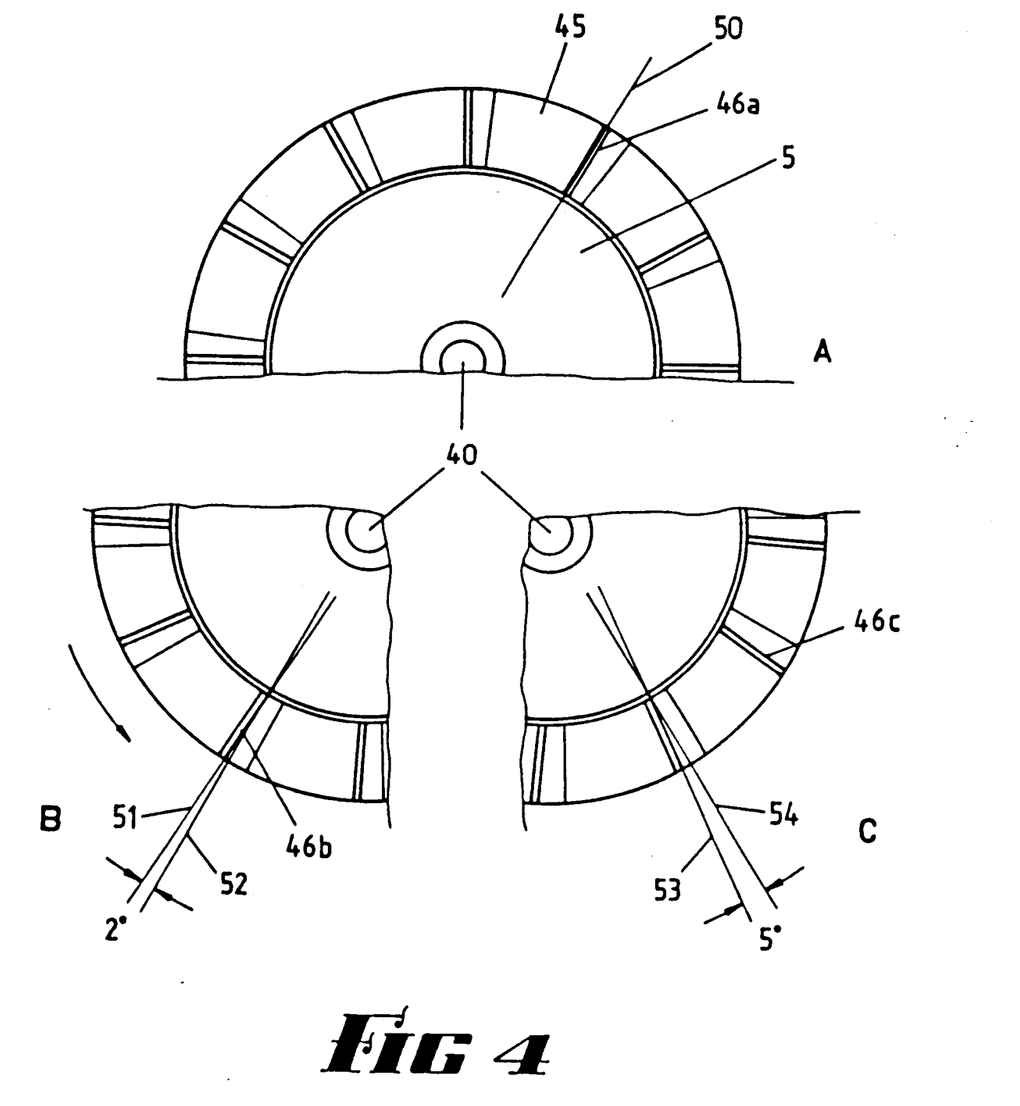
FIG. 4 shows the angles to which the vanes on the thrower wheel may be positioned.

Now looking at FIG. 4, it will be seen that there is a cross-sectional view of the thrower wheel shown in FIG. 3. FIG. 4A shows the wheel 5 includes side flange 45 and vanes 46. The vanes 46a in FIG. 4A are at an angle 0 degrees to the radial line 50 from the axle 40 of the wheel 5.

In FIG. 4B, the vanes 46b are at an angle of 2 degrees as shown by the line 51 from the radial line 52 from the axle 40 of the wheel 5.

In FIG. 4C, the vanes 46c are at an angle of 5 degrees as shown by the line 53 from the radial line 54 from the axle 40 of the wheel 5.

This angling of the vanes assists with collection and throwing of the material in small groups or clumps.

Figure 5:
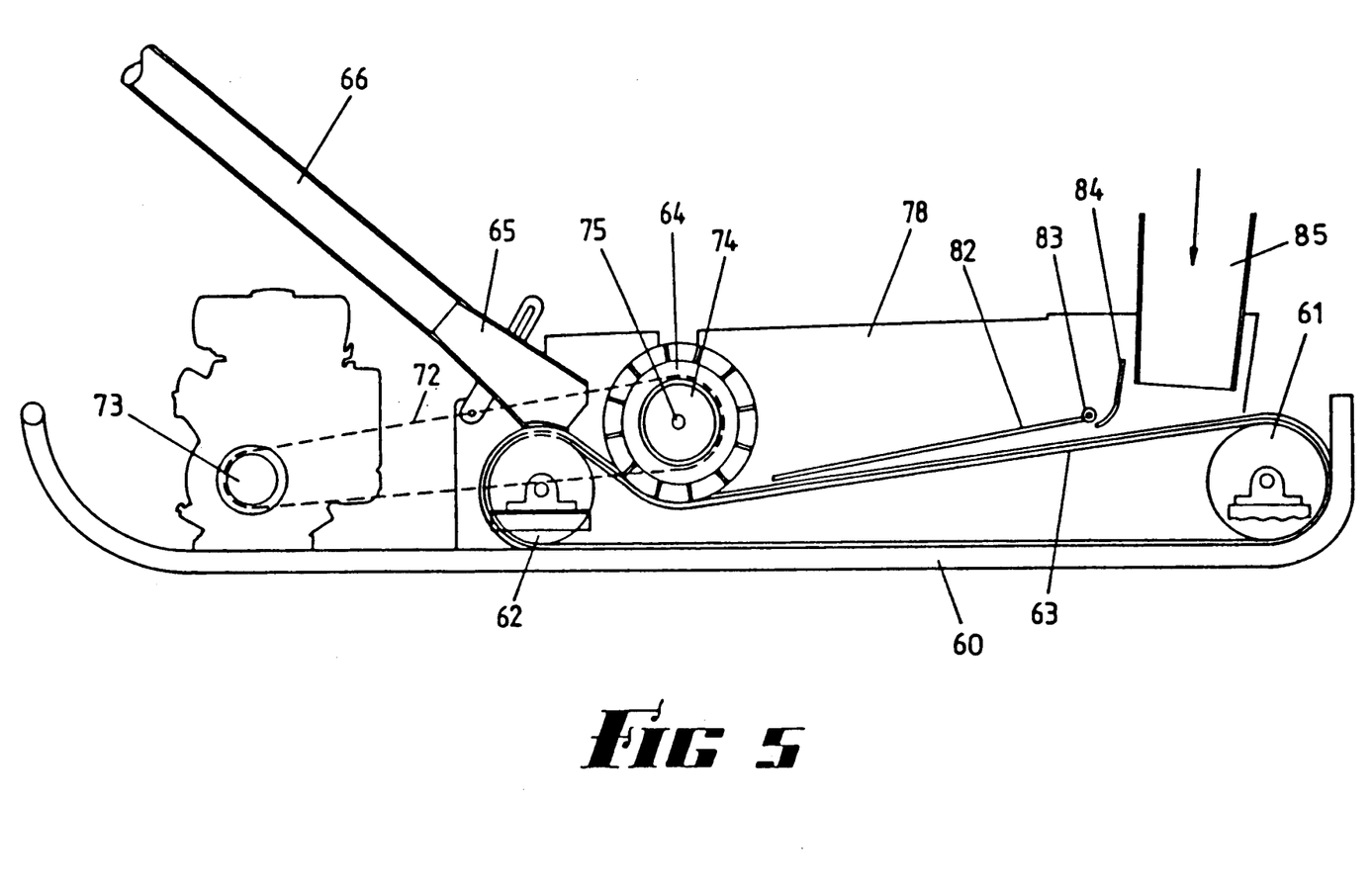
FIG. 5 shows an alternative embodiment of the thrower according to this invention.
Figure 6:
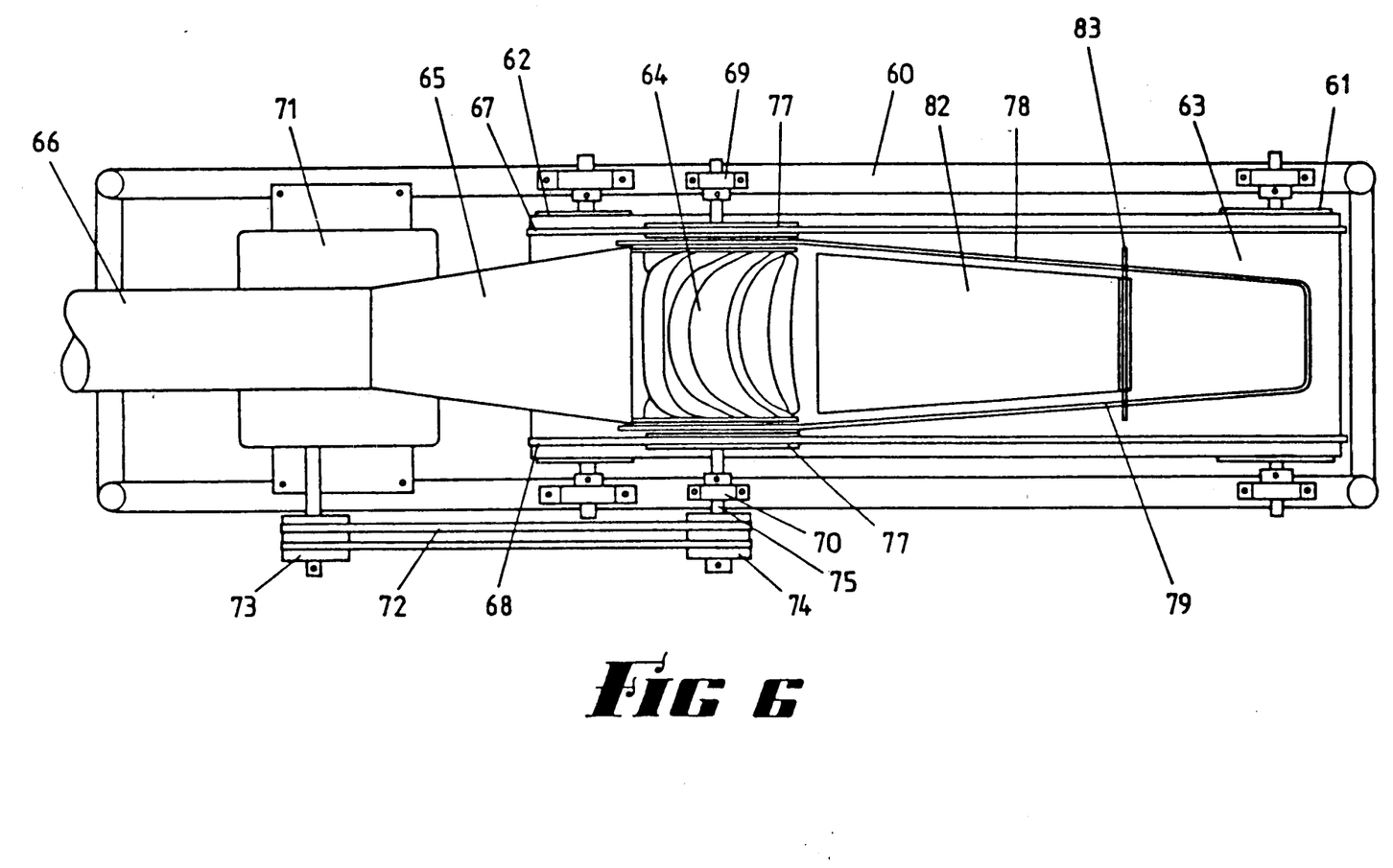
FIG. 6 shows a plan view of the embodiment shown in FIG. 5.

FIGS. 5 and 6 show an alternative embodiment of the invention.

Figure 8:
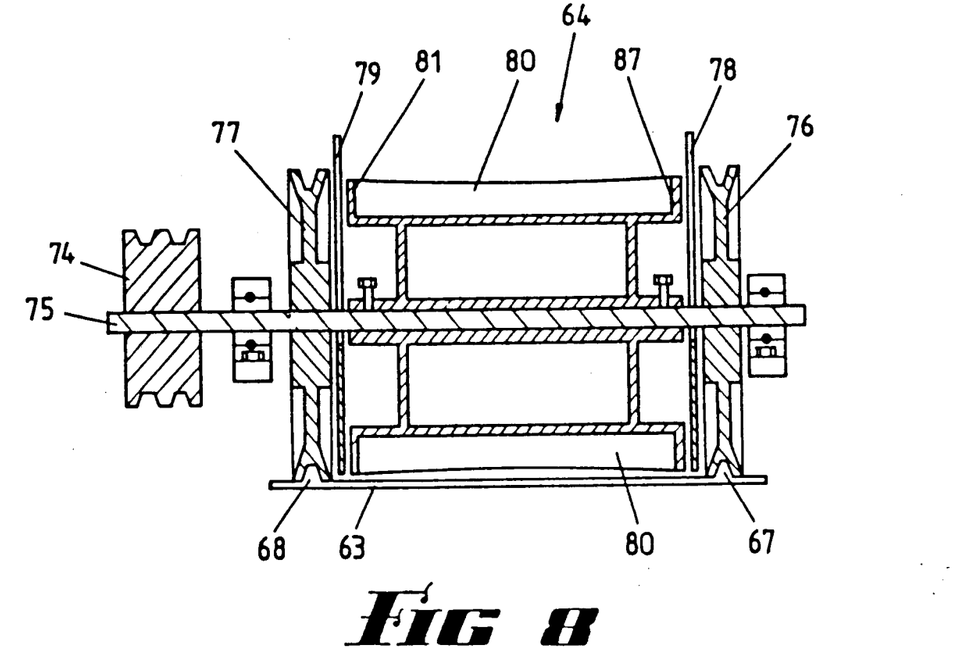
FIG. 8 shows a cross-sectional view of the thrower wheel of the embodiment shown in FIG. 5 and FIG. 7.
Figure 9:
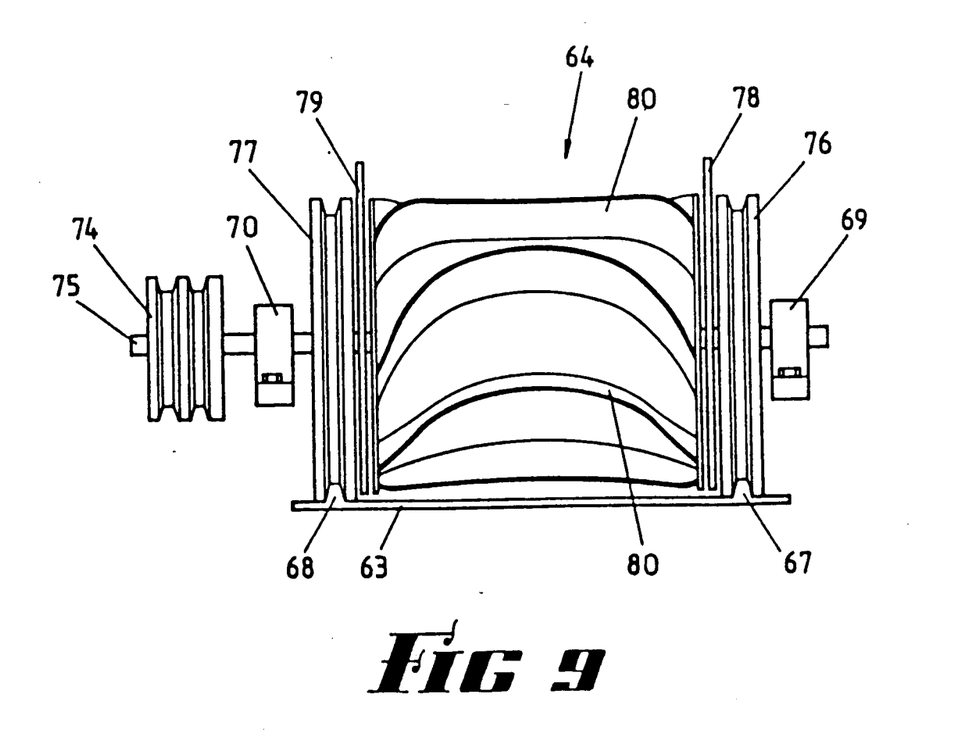
FIG. 9 shows a further view of the thrower wheel of the embodiments shown in FIGS. 5 and 7.

In this embodiment, a frame 60 includes loading end roller 61, a discharge end roller 62 and a belt 63 passing over the two rollers. A thrower wheel 64 positioned near the discharge end roller 62 depresses the belt 63. An inlet chute 85 enables particulate material to be deposited on to the belt and an outlet chute 65 collects discharged material and directs it into an outlet duct 66. The construction of the thrower wheel is more particularly shown in FIGS. 8 and 9.

As in the earlier embodiment, the belt 63 includes side ridges 67 and 68. The thrower wheel 64 is mounted on bearings 69 and 70 mounted to the frame 60. A motor 71 drives, by means of a pair of belts 72, from a drive pulley 73 to a driven pulley 74 on the shaft 75 of the thrower wheel 64. Guide wheels 76 and 77 are mounted for rotation on the shaft 75 and, in fact, drive the belt 63. The actual thrower wheel 64 is of a similar construction to the thrower wheel as shown in FIG. 3, and again there is a gap between the guide wheels 76 and 77 and the thrower wheel 64 for the guide plates 78 and 79 respectively to fit.

Once again, the vanes 80 on the guide wheel 64 are considerably cupped to ensure collection of groups, parcels or clumps of material for throwing. In a preferred embodiment, the guide wheel is approximately 300 mm wide and the cupping is about 100 mm from a straight line between the side flanges 81.

It will be realised that the amount of cupping will depend upon the type of material to be thrown and ban vary from no cupping to at least 100 mm. Once again, with this embodiment, the cups may be angled slightly back as discussed in particular in relation to FIG. 4.

In the embodiment shown in FIGS. 5 and 6, there is provided a compression flap or plate 82 hinged at 83 to depend onto the belt 63 so that particulate material dropped on to the belt 63 through the chute 85 will be caused to be held onto the belt and, therefore, be accelerated up to belt speed.

This embodiment also includes a curved guide 84 to ensure that no loss of material occurs between the inlet chute 85 and the compression flap 82. These may also prevent dust from being raised.

It will be realised in an alternative embodiment, the compression flap may be fixed just above the belt.

Figure 7:
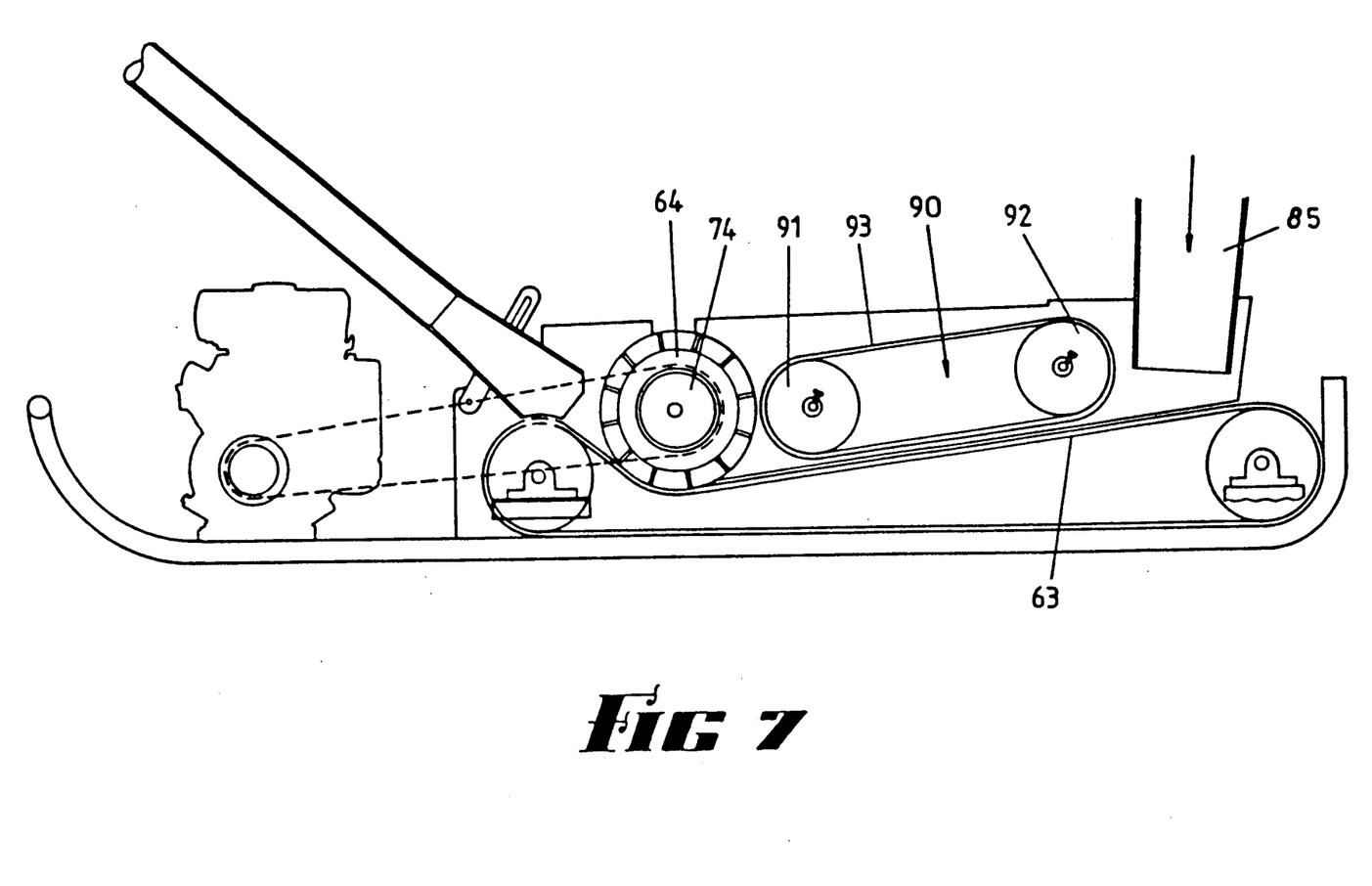
FIG. 7 shows an alternative embodiment of the thrower wheel.

. FIG. 7 shows an alternative embodiment with substantially the same construction as shown in FIGS. 5 and 6 but in this embodiment, a further belt assembly 90 acts as a compression arrangement. In this embodiment, rollers 91 and 92 have a further continuous belt 93 acting onto the belt 63 and driven thereby to cause any particulate material dropped onto the belt through chute 85 to be held onto the belt 63 and thereby accelerate up to the belt speed.

It has been found that according to the invention that due to the shape of the blades the particulate material is collected into the parcels or clumps, with a force which tends to compress or compact the particulate material into clumps or parcels. Thus each clump or parcel is not a loose collection of the particulate material, but is a slightly compacted or compressed collection of the particulate material which then greatly assists in the throwing and accurate placement of the particulate material.

What is claimed is:

1. A particulate material thrower comprising an endless belt running over a pair of spaced apart rollers thereby providing a loading end and a discharge end, spaced lengthwise from the loading end, on the belt, a thrower wheel running on the belt adjacent the roller at the discharge end, characterized by the thrower wheel including side flanges and a plurality of vanes extending between the side flanges, the vanes being shaped so as to collect material moving along the belt from the loading end before throwing, and by pre-acceleration means whereby to pre-accelerate material placed on the belt before the material reaches the thrower wheel.

2. The particulate material thrower as in claim 1, wherein the endless belt includes continuous ridges along its sides and the thrower wheel includes guide wheels running on the ridges.

3. The particulate material thrower as in claim 1, wherein the pre-acceleration means comprises a second vaned wheel running on the belt upstream from the thrower wheel.

4. The particulate material thrower as in claim 2, wherein the pre-acceleration means comprises a second vaned wheel running on the belt upstream from the thrower wheel.

5. The particulate material thrower as in claim 3, wherein the second vaned wheel is driven at a slower speed than the first vaned wheel by means of a belt drive from the first wheel.

6. The particulate material thrower as in claim 4, wherein the second vaned wheel is driven at a slower speed than the thrower wheel by means of a belt drive from the first wheel.

7. The particulate material thrower as in claim 3, wherein the second vaned wheel includes guide wheels running on the continuous ridges on the belt.

8. The particulate material thrower as in claim 1, wherein the pre-acceleration means comprises an elongate portion of the continuous belt upstream from the thrower wheel.

9. The particulate material thrower as in claim 8, and further including a compression plate above the belt upstream from the thrower wheel.

10. The particulate material thrower as in claim 8, and further including a further continuous belt above the first belt to act as a compression means.

11. The particulate material thrower as in claim 1, wherein each vane forms an angle of from 0 degrees to 5 degrees with respect to the radius of the wheel.

12. The particulate material thrower as in claim 4 wherein the second vaned wheel includes guide wheels running on the continuous ridges on the belt.

13. The particulate material thrower as in claim 1, wherein the pre-acceleration means comprises an elongated portion of the endless belt so that the particulate material travels along the endless belt for a time before it reaches the thrower wheel.

14. A particulate material thrower comprising an endless belt running over a pair of spaced apart rollers thereby providing a loading end and a discharge end, spaced lengthwise from the loading end, on the belt, a thrower wheel running on the belt adjacent the roller at the discharge end, characterized by the thrower wheel including side flanges and a plurality of vanes extending between the side flanges, the vanes being shaped so as to collect material moving along the belt from the loading and before throwing, and by the endless belt including continuous ridges along its sides, the thrower wheel including guide wheels running on the ridges.

15. A particulate material thrower comprising an endless belt running over a pair of spaced apart rollers thereby providing a loading end and a discharge end, spaced lengthwise from the loading end, on the belt, a thrower wheel running on the belt adjacent the roller at the discharge end, characterized by the thrower wheel including side flanges and a plurality of vanes between the side flanges, the vanes being shaped so as to collect material moving along the belt from the loading end before throwing, and by pre-acceleration means whereby to pre-accelerate material placed on the belt before the material reaches the thrower wheel.

* * * * *